(12) United States Patent
Hasz et al.

(10) Patent No.: US 6,497,758 B1
(45) Date of Patent: Dec. 24, 2002

(54) METHOD FOR APPLYING A HIGH-TEMPERATURE BOND COAT ON A METAL SUBSTRATE, AND RELATED COMPOSITIONS AND ARTICLES

(75) Inventors: Wayne Charles Hasz, Pownal, VT (US); D Sangeeta, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 148 days.

(21) Appl. No.: 09/614,248

(22) Filed: Jul. 12, 2000

(51) Int. Cl.$^7$ ............................... C09D 5/00; C09D 1/00
(52) U.S. Cl. .................... 106/1.05; 106/286.1
(58) Field of Search ................. 106/1.05, 286.1

(56) References Cited

U.S. PATENT DOCUMENTS

| | | | |
|---|---|---|---|
| 3,847,559 A | * 11/1974 | Reznik | 428/678 |
| 4,325,754 A | * 4/1982 | Mizuhara et al. | 148/22 |
| 5,549,927 A | 8/1996 | Cottone et al. | 427/191 |
| 6,355,356 B1 | * 3/2002 | Hasz | 416/241 R |
| 2001/0006187 A1 | * 7/2001 | Hasz et al. | 228/119 |
| 2001/0019781 A1 | * 9/2001 | Hasz | 428/633 |
| 2002/0004143 A1 | * 1/2002 | Hasz et al. | 428/632 |

FOREIGN PATENT DOCUMENTS

EP          1172460 A2 *  1/2002    ........... C23C/26/02

OTHER PUBLICATIONS

"Ceramic Slurry Coatings for Advanced Heat Engines", L. Kamo et al., Proceedings of the International Thermal Spray Conference & Exposition, Orlando, FL, USA, May 28–Jun. 5, 1992.

* cited by examiner

*Primary Examiner*—Helene Klemanski
(74) *Attorney, Agent, or Firm*—Paul J. DiConza; Patrick K. Patnode

(57) ABSTRACT

A method for applying a bond coat on a metal-based substrate is described. A slurry which contains braze material and a volatile component is deposited on the substrate. The slurry can also include bond coat material. Alternatively, the bond coat material can be applied afterward, in solid form or in the form of a second slurry. The slurry and bond coat are then dried and fused to the substrate. A repair technique using this slurry is also described, along with related compositions and articles.

3 Claims, 1 Drawing Sheet

US 6,497,758 B1

METHOD FOR APPLYING A HIGH-TEMPERATURE BOND COAT ON A METAL SUBSTRATE, AND RELATED COMPOSITIONS AND ARTICLES

This invention was made with government support under Contract No. DEFC21-95-MC31176 awarded by the Department of Energy. The government may have certain rights to the invention.

BACKGROUND OF THE INVENTION

The invention disclosed herein generally relates to bond coatings and thermal barrier coatings applied to metals. The metals are frequently portions of components used in turbine engines. The invention also relates to processes for depositing such coatings.

Components formed of specialty materials like superalloys are used in various industrial applications, under a diverse set of operating conditions. In many cases, the components are provided with coatings which impart several characteristics, such as corrosion resistance, heat resistance, oxidation resistance, and wear resistance. As an example, the various components of turbine engines, which typically can withstand in-service temperatures in the range of about 1100° C.–1150° C., are often coated with thermal barrier coatings (TBC's), to effectively increase the temperature at which they can operate.

Most TBC's are ceramic-based, e.g., based on a material like zirconia (zirconium oxide), which is usually chemically stabilized with another material such as yttria. For a jet engine, the coatings are applied to various superalloy surfaces, such as turbine blades and vanes, combustor liners, and combustor nozzles. Usually, the TBC ceramics are applied to an intervening bond coating (sometimes referred to as a "bond layer" or "bond coat") which has been applied directly to the surface of the metal part. The bond coat is often critical for improving the adhesion between the metal substrate and the TBC.

The effectiveness of a TBC is often measured by the number of thermal cycles it can withstand before it delaminates from the substrate which it is protecting. In general, coating effectiveness decreases as the exposure temperature is increased. The failure of a TBC is often attributed to weaknesses or defects related in some way to the bond coating, e.g., the microstructure of the bond coating. TBC failure can also result from deficiencies at the bond coating-substrate interface or the bond coating-TBC interface.

The microstructure of the bond coating is often determined by its method of deposition. The deposition technique is in turn determined in part by the requirements for the overlying protective coating. For example, many TBC's usually require a very rough bond coat surface (e.g., a root mean square roughness ($R_a$) value of greater than about 200 micro-inches), for effective adhesion to the substrate. An air plasma spray (APS) technique is often used to provide such a surface.

There continues to be a need in the art for bond coatings which provide very good adhesion between the substrate and a subsequently-applied TBC, e.g., bond coatings with a relatively rough surface. Furthermore, new processes for applying and curing such coatings in regions of a substrate which are somewhat inaccessible are also of great interest. (Conventional thermal spray equipment is sometimes too large and cumbersome for such regions). Moreover, the entire TBC system—bond coating with the TBC itself—should exhibit good integrity during exposure to high temperatures and frequent thermal cycles. Such a system should be effective in protecting components used in high performance applications, e.g., superalloy parts exposed to high temperatures and frequent thermal cycles.

SUMMARY OF THE INVENTION

One embodiment of the present invention is directed to a method for applying a bond coat on a metal-based substrate, comprising the following steps:

a) applying a slurry which comprises braze material to the substrate, wherein the slurry also contains a volatile component;

b) applying bond coat material to the substrate;

c) drying the slurry and bond coat material under conditions sufficient to remove at least a portion of the volatile component; and d) fusing the braze material and bond coat material to the substrate.

The braze material is usually based on nickel, cobalt, or iron. The bond coat material is often an "MCrAlX" material or a metal carbide, as discussed below.

There are a variety of methods for applying the bond coat according to this invention. One method calls for combining the bond coat material and the braze material with a solvent and one or more additives, as described below. The combined slurry mixture can then be deposited on the substrate by various techniques, such as flow-coating, brushing, or spraying. As an alternative, the slurry applied in step (a) includes the braze material but not the bond coat material, and is substantially dried to form a green layer. An adhesive can be applied to the green layer, and the bond coat particles can then be applied to the adhesive, prior to the fusing step. As another alternative, two separate slurries can be employed—one containing the braze material, and the other containing the bond coat material. Each slurry can contain the additives described below. In this embodiment, the braze slurry is usually applied first, followed by the application of the bond coat slurry. The slurries can then be dried and fused to the substrate. An overcoat can optionally be applied over the bond coat. The overcoat is usually a conventional thermal barrier coating, e.g., one based on zirconium. Alternatively, the overcoat can be of another type, such as a metal carbide-based wear coating.

A method for replacing a bond coat applied over a metal-based substrate is also described below. The following steps are usually included in this method:

(i) removing the existing bond coat from a selected area on the substrate;

(ii) applying a slurry which comprises braze material to the selected area, wherein the slurry also contains a volatile component;

(iii) applying additional bond coat material to the selected area; and (iv) fusing the braze material and bond coat material to the selected area.

This technique can be part of the overall process for repairing a worn or damaged TBC system.

Another embodiment of this invention is directed to a unique slurry composition, containing a braze material and a bond coat material, along with other conventional slurry ingredients, such as a solvent. As discussed elsewhere, the braze material is usually nickel, cobalt, iron, a precious metal, or some mixture containing one of those components. The bond coat material is usually of the MCrAlX-type (discussed below), or can be a metal carbide or other type of material. The slurry composition is very useful in the formation of a TBC system.

An article constitutes another embodiment of this invention. It comprises:

(a) a metal-based substrate, and (b) a volatile-containing slurry on the substrate, comprising braze material and bond coat material (e.g. roughness-producing bond coat particles).

The substrate is often a superalloy, and the braze material and bond coat materials are as described below. When the volatile component in the slurry has been substantially removed, a green coating remains, which is fused to the substrate, e.g., by brazing. As fused, the braze material forms a continuous matrix phase in which the bond coat particles are embedded.

Other features and advantages of the present invention will be more apparent from the following detailed description of the invention.

DETAILED DESCRIPTION OF THE INVENTION

Figure 1:
FIG. 1 is a cross-sectional photomicrograph of a comparative coating system which includes a bond coat and a TBC, both applied by conventional methods.

The braze material used in this invention can be formed of an alloy composition which is known in the art and commercially available. Two classes of braze compositions are frequently used: standard liquid brazes and activated diffusion brazes. Very often (but not always), the braze alloy has a composition similar to that of the substrate. For example, if the substrate is a nickel-base superalloy, the braze alloy usually contains at least about 40% by weight nickel, along with various other elements, like chromium, aluminum, and yttrium. (Nickel-containing braze or cobalt-containing braze alloys are usually used with cobalt-base superalloys). The braze alloy composition also typically contains one or more components for lowering its melting point. Examples of melting point suppressants for nickel-base and cobalt-base braze alloy compositions are silicon, boron, and phosphorous. Silicon or boron, or combinations thereof, are often preferred. The braze alloy composition may also contain other additives known in the art, e.g., fluxing agents. The average particle size of the braze alloy is usually in the range of about 20 microns to about 150 microns, and more preferably, in the range of about 40 microns to about 80 microns.

Illustrative nickel-base and cobalt-base braze alloy compositions are described in the commonly-assigned U.S. patent application Ser. No. 09/444,737 (W. Hasz), filed on Nov. 23, 1999, now U.S. Pat. No. 6,355,356, and incorporated herein by reference. Some preferred nickel-base braze alloy compositions for the present invention comprise about 5 wt % to about 15 wt % silicon or boron; and about 15 wt % to about 25 wt % chromium, with the balance being nickel. Silicon is sometimes preferred over boron. Mixtures of silicon and boron are also possible.

Other types of braze alloys may be used, e.g., precious metal compositions containing silver, gold, platinum, and/or palladium, in combination with other metals, such as copper, manganese, nickel, chromium, silicon, and boron. Mixtures which include at least one of the braze alloy elements are also possible. Many of the metal braze compositions are available from Praxair Surface Technologies, Inc.

As mentioned above, the braze material is utilized in the form of a slurry. The slurry usually contains at least one binder and a solvent. Selection of the solvent depends on various factors, such as its capacity for solubilizing the binder and dispersing the braze powder; as well as the manner in which the slurry will be applied to the substrate. The braze material can usually be dispersed in either an aqueous or organic solvent. Examples include water, ethanol or other alcohols; ketones, nitrile solvents (e.g., acetonitrile); ketone-type solvents like acetone; aromatic solvents like toluene, xylene, or xylenol; and compatible mixtures thereof. Sometimes, a two-solvent system is preferred, in which one solvent flash-evaporates, while the other evaporates more slowly and provides leveling properties. (As used in this disclosure, the term "volatile component" generally refers to the solvent (or multiple solvents) used in the slurry. It should also be understood that the binders and other ingredients in the slurry will also volatilize, or will decompose, as the temperature is raised, e.g., as fusing temperatures are approached).

A variety of binder materials may be used in the slurry, e.g., water-based organic materials such as polyethylene oxide and various acrylics, or solvent-based binders. The slurry may also contain various other additives, such as dispersants, wetting agents, deflocculants, stabilizers, anti-settling agents, thickening agents, plasticizers, emollients, lubricants, surfactants, anti-foam agents, and curing modifiers. In general, the additives are each used at a level in the range of about 0.01% by weight to about 10% by weight, based on the weight of the entire slurry composition. Those skilled in the art can determine the most effective level for any of the additives, without undue effort.

Conventional details related to the mixing of the slurry are described in various references, such as U.S. Pat. No. 4,325,754, which is incorporated herein by reference. (Slurry compositions are also commercially available). A variety of techniques can be used to apply the slurry to the substrate. Examples include slip-casting, brushing, painting, dipping, flow-coating, roll-coating, spin coating, and spraying. Various texts are instructive in this regard, e.g., the Kirk-Othmer *Encyclopedia of Chemical Technology*, 4th Edition, Vol. 5, pp. 606–619; as well as the *Technology of Paints, Varnishes and Lacquers*, Edited by C. Martens, Reinhold Book Corporation, 1968. U.S. patent application Ser. No. 09/378,956 (D. Sangeeta et al, filed Aug. 23, 1999 and commonly-assigned) also describes some aspects of slurry technology, and is incorporated herein by reference.

Various types of bond coat materials can be used in the present invention. Most are well-known in the art. "High-temperature" bond coats are often (but not always) preferred. These are bond coats used in applications where the substrate is exposed to service temperatures of at least about 500° C., and more often, at least about 900° C. Very often, the bond coat material is of the MCrAlX type, where "M" can be various metals or combinations of metals, such as Fe, Ni, or Co; and where "X" is selected from the group consisting of Y, Ta, Si, Hf, Ti, Zr, B, C, and combinations thereof. ("X" is usually yttrium). Some of the preferred alloys of this type have a broad composition (in weight percent) of about 17% to about 23% chromium; about 4% to about 13% aluminum; and about 0.1% to about 2% yttrium; with M constituting the balance. In some embodiments, M is a mixture of nickel and cobalt, wherein the ratio of nickel to cobalt is in the range of about 10:90 to about 90:10, by weight.

As alluded to earlier, other types of bond coat materials can be used. Non-limiting examples include aluminide, platinum-aluminide; nickel-aluminide; platinum-nickel-aluminide, and mixtures thereof. Moreover, mixtures of MCrAlY-type materials with metals such as zirconium or hafnium may also be used. Those skilled in the art will be able to select the most appropriate bond coat material, based on end use, cost, processing method, and other considerations.

The size of the bond coat particles may vary somewhat, and is related in part to the desired roughness for the bond coat. Usually, the bond coat particles have an average particle size of at least about 45 microns. In those instances in which a subsequent TBC is to be applied by air plasma spray (which often requires a rough, underlying surface), the bond coat particles usually have an average particle size of at least about 150 microns. In some preferred embodiments, the bond coat particles have a size in the range of about 150 microns to about 300 microns. Larger particle sizes may be used in some cases, e.g., when greater roughness is desired. Sometimes, these particles are referred to herein as the "primary bond coat particles", which provide the conventional type of roughness ($R_a$) discussed below.

In preferred embodiments, especially in situations where an air plasma-sprayed TBC is to be applied, the bond coat particles have a particular shape. The shape is sufficient to produce micro-roughness in the bond coat after the material has been fused to the substrate with the braze. The micro-roughness is distinct from, and in addition to, the roughness ($R_a$) provided by the primary bond coat particles. (The conventional roughness is usually measured by surface profilometry.) Micro-roughness is a fine-scale roughness and back-folding on the primary particle. All embodiments of the present invention provide very good adhesion for a subsequently-applied TBC. However, the presence of the micro-roughness greatly increases that adhesion in many instances, during the service life of the TBC.

There are several ways of obtaining micro-roughness, and they usually involve the use of bond coat powder which is commercially available and known to provide such an effect. The micro-roughness may be in the form of smaller spheres of the bond coat material (e.g., having a size in the range of about 5% to about 50% of the primary particle diameter) which are bonded to the larger, primary particles.

Alternatively, the micro-roughness may be in the form of an irregular or rough surface on the primary particles. In this instance, the surface of the primary particles is convoluted and somewhat jagged, with undercut sections which appear to back-fold in some areas. Such a particle surface has an appearance similar to that resulting when one would tear an English muffin in half. Powder particles having these characteristics (e.g., with an MCrAlX-type composition) are commercially available.

In one embodiment of this invention, the slurry also contains the bond coat material, so that the braze material and the bond coat material are applied to the substrate simultaneously. Any convenient technique for combining the braze and bond coat materials in a single slurry may be employed, e.g., mechanical mixers. In addition to following general safety procedures, care should be taken to keep each of the metal components well-dispersed in the slurry. At least one aqueous or organic solvent is used for the slurry. Choice of a particular solvent or solvent mixture for this embodiment will depend in part on the solvent's compatibility with both the braze and bond coat materials, as well as with any melting point suppressant which may be present.

The solvents should also be capable of maintaining the solid components substantially dispersed. Moreover, the additives (mentioned above) which are used in the slurry should be compatible with each other, and with the other components in the slurry.

The slurry is usually deposited on the substrate as a single layer. However, in some instances, it may be desirable to deposit the slurry in the form of at least two "sub-layers", i.e., in at least two applications. For example, each sub-layer may include the same composition, but the size of the bond layer particles may be varied. Smaller particles may be used in the sub-layer closest to the substrate, for increased coating density. Larger particles may be used in one or more upper sub-layers, to provide a desired amount of roughness. (A heat treatment could be applied after the application of each sub-layer).

As another alternative, the composition of two or more sub-layers can be varied, to provide different properties at different depths of the bond coat. As an example, a first sub-layer could contain a standard NiCrAlY-type bond coat material, along with the braze alloy. A second sub-layer applied over the first sub-layer could contain braze alloy, along with a different bond coat material, e.g., an MCrAlX-type bond coat material in which M is a mixture of nickel and cobalt. The second sub-layer, which is closer to the atmosphere during service, should provide greater corrosion resistance than the standard NiCrAlY material in some environments.

In a similar fashion, the composition of two or more sub-layers could be varied to adjust the degree to which oxidation occurs, e.g., oxidation at the bond coat-substrate interface, as discussed in the examples. Moreover, the composition of the bond coat could be graded or layered, (e.g., by a metering system), so that the change in particular constituents is gradually made as the slurry component is applied over the substrate.

After the slurry mixture has been deposited, at least a portion of the volatile material contained therein is removed. This step is sometimes referred to as an "evaporation step" or "evaporation stage", and results in a substantially-devolatilized (solvent-free) coating, i.e., a "green" coating. Any convenient drying technique can be used to remove the volatile component. Drying may include air- or vacuum-drying at room temperature. In some instances, it may be desirable to heat the slurry mixture to accelerate drying.

The green coating, which contains the braze material and the bond coat material, is then fused to the substrate. The fusing step can be carried out by various techniques. Very often, it is a brazing step, and is similar to any conventional brazing operation. (As used herein, "brazing" is generally meant to include any method of joining metals that involves the use of a filler metal or alloy.) One exemplary reference for details regarding brazing is the text *Modern Metalworking,* by J. R. Walker, The Goodheart-Willcox Co., Inc., 1965, pp. 29-1 to 30-24. Those of ordinary skill in the art are familiar with other details regarding brazing. Brazing temperatures depend in part on the type of braze alloy used, and are typically in the range of about 525° C. to about 1650° C. In the case of nickel-based braze alloys, braze temperatures are usually in the range of about 800° C. to about 1260° C. When possible, brazing is often carried out in a vacuum furnace. The amount of vacuum will depend in part on the composition of the braze alloy. Usually, the vacuum will be in the range of about $10^{-1}$ torr to about $10^{-8}$ torr. Furnace brazing also removes any volatile materials (e.g., the binder) remaining in the green coating.

Volatile content can be determined by a variety of techniques, such as differential thermal analysis (DTA) and thermal gravimetric analysis (TGA).

In some cases, the slurry may have to be applied to an area which does not lend itself to the use of a furnace. As an example, the component itself may be too large for insertion into a furnace. In such a case, alternatives are possible. For example, a torch or other localized heating means can be used. These techniques are known in the art and briefly described in the commonly-assigned patent application of W. Hasz, Ser. No. 09/444,737, now U.S. Pat. No. 6,355,356 mentioned above and incorporated herein by reference.

In an alternative embodiment, the slurry contains the braze material and any necessary additives, but does not contain the bond coat material. In this instance, the slurry is substantially dried after being applied, to form a green layer. Any convenient drying technique can be used, like those described above, e.g., air drying, prior to or following an optional heat treatment to increase the evaporation of the volatile component.

The bond coat material—usually in the form of dry powder particles is then applied over the green layer. Usually, an adhesive is applied to a surface of the green layer, prior to the application of the bond coat powder. A variety of adhesives can be used, as long as they are capable of completely volatilizing during the subsequent fusing step. Some of the suitable adhesives are described, for example, in *The Condensed Chemical Dictionary*, 10th Edition, B. Hawley, Van Nostrand Reinhold Company Inc., 1981, pp. 20–21, which is incorporated herein by reference. Illustrative examples of adhesives include polyethylene oxide and acrylic materials. Commercial examples of braze adhesives include "4B Braze Binder™", available from Cotronics Corporation. The adhesive can be applied by various techniques. For example, liquid-like adhesives can be sprayed or coated onto the surface. A thin mat or film with double-sided adhesion could alternatively be used, e.g., 3M Company's 467 ™Adhesive Tape.

The bond coat powder can then be randomly applied over the adhesive by a variety of techniques, e.g., sprinkling, pouring, blowing, roll-depositing, and the like. After the deposition, the excess powder is removed from the substrate (e.g., by shaking or by being blown off), leaving substantially a single layer of bond coat particles. As described previously, the size of the particles depends in large part on the degree of roughness required for the bond coat. The green coating (to which the braze material is attached) is then fused to the substrate, as described above. The resulting coating system is substantially identical to that formed in the first embodiment.

In another alternative embodiment, the bond coat material can be used in the form of a second slurry, i.e., separate from the slurry which contains the braze material. The second slurry would be formed with at least one solvent, i.e., a solvent compatible with the particular bond coat composition. The slurry would also contain one or more of the other additives described previously, e.g., binders, dispersants, and the like. Moreover, the slurry can be applied over the first slurry by any of the techniques described above, such as spraying. In preferred embodiments, some or all of the volatile component in the first slurry is removed before the application of the second slurry, to avoid bubbling. Removal of the volatiles is usually carried out by heating, as described above. Volatiles are then removed from the second slurry in a same or similar manner, prior to the fusing step. The resulting coating system is substantially identical to that formed in the other embodiments.

As another alternative, the bond coat can be in the form of a second slurry which is then pre-mixed with the first slurry. The resulting pre-mixture can be applied to the substrate, prior to removal of the volatile component. Fusing is then carried out in the manner described previously.

In some embodiments of the present invention, an overcoat is applied over the bond coat, after the bond coat material has been fused to the substrate with the braze material. The overcoat is usually a thermal barrier coating, but it could be any type of coating which provides environmental protection, i.e., protection of the substrate from the adverse effects of oxidation, corrosion, or chemical attack. The overcoat could also be a wear-resistance coating. Moreover, the overcoat is usually ceramic, but could alternatively be metallic.

Ceramic thermal barrier coatings are often (but not always) zirconia-based. As used herein, "zirconia-based" embraces ceramic materials which contain at least about 50% zirconia, by weight. Zirconia is a well-known compound for barrier coatings. Its use is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

Various techniques can be used to apply the ceramic coating. Non-limiting examples include a thermal spray technique such as APS; physical vapor deposition (PVD); or electron beam physical vapor deposition (EB-PVD). Those of ordinary skill in the art are familiar with the details regarding each of these deposition techniques. Related references include Kirk-Othmer's *Encyclopedia of Chemical Technology*, 3rd Edition, Vol. 15, (1981) and Vol. 20 (1982); *Ullmann's Encyclopedia of Industrial Chemistry*, Fifth Edition; Volume A6, VCH Publisher (1986); *Scientific American*, H. Herman, September 1988; and U.S. Pat. No. 5,384,200. Ceramic slurry techniques or sol gel techniques can also be used to apply the ceramic coating.

Examples of other types of materials for the overcoat include wear-resistant coatings, e.g., carbide coatings such as chromium carbide and tungsten carbide, and those formed from cobalt-molybdenum-chromium-silicon. Other types of material could be used as well, e.g., alumina, mullite, zircon, and glassy-type materials such as strontium-calcium-zirconate glass. Those of ordinary skill in the art will be able to select the most appropriate material for a given end use application. Methods for preparing and applying such materials are those described above for the zirconia TBC's, or consist of other techniques well-known in the art. Moreover, some of the overcoats can be prepared and applied in the form of a slurry over the bond coat, as mentioned above. Slurry-based overcoats are also described in the commonly-assigned U.S. patent application of D. Sangeeta, Ser. No. 09/557,393, filed on Apr. 24, 2000 and incorporated herein by reference. For example, the Summary of the Invention and other sections of that patent application are instructive.

Another embodiment of this invention is directed to a method for replacing a bond coat previously applied to a metal-based substrate. The replacement of the bond coat is often a part of the overall process of repairing a worn or damaged TBC. Careful repair of a TBC "system" (bond coat and TBC) is critical in preventing degradation of the substrate. In the case of a turbine engine component, for example, it may be necessary to repair the coating while the turbine is in service, i.e., after its delivery from the manufacturing site. The process disclosed herein provides a means for rapidly repairing or replacing selected areas of an existing TBC system, without having to completely remove the coatings from the entire part. The process is especially useful for repairing coatings which are situated in areas not easily accessible to other repair techniques.

The steps for replacing the bond coat usually comprise:
(i) removing the existing bond coat (and a worn or damaged overcoat, if present) from a selected area on the substrate;
(ii) applying a slurry which comprises braze material to the selected area, wherein the slurry also contains a volatile component;
(iii) applying additional bond coat material to the selected area; and
(iv) fusing the braze material and bond coat material to the selected area.

As described previously, a single slurry can be used, containing both the braze material and the bond coat material. Alternatively, two separate slurries can be used. As another alternative, a braze slurry can be applied and then dried, followed by the application of an adhesive layer. Bond coat material can then be applied to the adhesive layer.

The slurry and bond coat material can be air-dried between steps (iii) and (iv). Heating means, such as an IR lamp, may be used to accelerate removal of the volatile component. The fusing step is often carried out by using a torch or other portable heating apparatus.

In the case of a turbine engine component which includes the coating being repaired, the heat evolved during engine operation may be sufficient to remove the volatile component and carry out fusing step (iv). This means of heating and curing could in fact be postponed until a slurry-based overcoat has been applied, as described below.

An overcoat can then be applied over the bond coat, in those instances in which an overcoat is being replaced. Usually, the overcoat (e.g., a TBC) will be applied by a thermal spray process in a repair setting. Plasma spraying is one convenient technique. However, the overcoat can alternatively be applied over the bond coat in the form of a slurry, as discussed above (application Ser. No. 09/557,393 of Sangeeta). As mentioned earlier, turbine engine operation temperatures may be sufficient to remove all volatile material, fuse the braze material and bond coat to the substrate; and cure the overcoat, all in a single step.

Another embodiment of this invention is a slurry composition which comprises braze material and bond coat material. Such a slurry is useful for applying a bond coat, as described above. Standard liquid brazes or activated diffusion brazes can be used in the slurry. When the slurry is being applied to a nickel-base superalloy, the braze alloy usually contains at least about 40% by weight nickel, along with various other elements, like chromium, aluminum, and yttrium. The average particle size of the braze alloy is usually in the range of about 20 microns to about 150 microns, as mentioned above.

The bond coat material in the slurry is usually of the MCrAlX type, as described previously. The size of the bond coat particles may vary somewhat. They often have an average particle size of at least about 45 microns.

The choice of solvent for the slurry will depend in part on the solid components contained therein, and on the manner in which it will be applied to the substrate. Exemplary solvents are described above, along with binder materials and a variety of other additives, e.g., dispersants, wetting agents, and stabilizers. The level of braze material and bond coat in the slurry will depend on various factors, such as the desired thickness of the bond coat; the solubility and dispersibility of the bond coat and braze materials in the solvent or solvent mixture; and the manner in which the slurry will be applied. Usually, the slurry comprises about 20% by weight to about 50% by weight braze material, and about 50% by weight to about 80% by weight bond coat material, based on total slurry weight. The slurry typically contains about 10% or less by weight solvent, and about 10% or less by weight binder.

Still another embodiment of this invention is directed to an article, comprising:
(a) a metal-based substrate, e.g., one formed of a superalloy; and
(b) a volatile-containing slurry on the substrate, comprising braze material and bond coat material. The particular components which may be found in such a slurry have been described previously. When the volatile component in the slurry has been substantially removed, a green layer remains. The green layer is then fused to the substrate, e.g., by a brazing technique. In preferred embodiments, the braze material forms a continuous matrix phase in which the bond coat particles are embedded. The size of the bond coat particles can be selected to cause them to protrude beyond the matrix phase. In that instance, they serve as a relatively rough surface, e.g., one having an $R_a$ of greater than about 200 micro-inches, and preferably, greater than about 300 micro-inches. Such a surface provides excellent adhesion to a subsequently-applied ceramic layer. An article containing such a layer (e.g., a zirconia-based TBC) is also within the scope of this invention.

In order that those skilled in the art may better understand the invention, the following examples are provided by way of illustration, and not by way of limitation.

EXAMPLE 1

Sample A was provided for the purpose of comparison, and represents a typical TBC system. The substrate was a coupon made from a nickel-base superalloy. The coupon was grit-blasted and ultrasonically cleaned. A NiCrAlY-type bond coat was then air plasma-sprayed (APS) onto the substrate surface. The nominal bond coat composition was as follows: 68 wt % Ni, 22 wt % Cr, 9 wt % Al, and 1 wt % Y. The thickness of the bond coat was in the range of about 5–8 mils (about 127–203 microns). It had an average roughness $R_a$ of about 500 to about 900 micro-inches. A TBC (thermal barrier coating: yttria-stabilized zirconia, with 8 wt % by weight yttria) was then air plasma-sprayed over the bond coat. The thickness of the TBC was in the range of about 10–12 mils (about 254–305 microns).

Sample B represented an embodiment of the present invention. A slurry was first prepared by adding the following components to acetone, under agitation:
(a) coarse NiCrAlY-type bond coat powder, having an approximate composition as follows: 68 wt % Ni, 22 wt % Cr, 9 wt % Al, and 1 wt % Y. The powder had an average particle size of −30+100 mesh, i.e., 150–600 microns.
(b) High-temperature braze powder, commercially available as Amdry ® 100, having the following approximate composition: 10% by weight silicon; 19% by weight chromium, base nickel. The powder had an average particle size of about −100 mesh, i.e., less than about 150 microns.

(c) Nicrobraz® 300 binder (ethyl methacrylate in trichloroethane; available from Wall Colmonoy, Inc., Madison Heights, Mich.)

The metal powders were dry-mixed (50 wt % of component (a) and 50 wt % of component (b)). Components (c) and (d) were then added and mixed (10 wt % of each to the total slurry weight).

The slurry was applied (by brushing) to the same type of superalloy coupon used for sample A. The wet thickness of the slurry was about 5 mils (127 microns). The slurry was then allowed to air-dry for about 12 hours, during which at least about 15 wt % of the volatile material was removed. The resulting green coating was then heated in a vacuum furnace at a brazing temperature of about 1093–1204° C. (2000–2200° F.), for about 1 hour. A dense, rough bond coat was produced, having an $R_a$ of about 25 microns (about 984 micro-inches). The same type of thermal barrier coating (zirconia-based) used in sample A was then air plasma-sprayed over the bond coat.

FIG. 1 is a cross-sectional photomicrograph of the coating system for sample A. Region I is the substrate. Region II is an oxide region which has begun to form between the substrate and the bond coat, as a result of thermal testing. Region III is the bond coat itself, exhibiting the typical overlapping of bond coat material "splats" which result from APS deposition. Region IV is the TBC.

The overall coating system of sample A exhibits good integrity for some end uses, and for a projected service life. However, Region II results from accelerated oxidation at the bond coat-substrate interface, toward the end of a simulated service life. The oxidation will eventually result in coating failure, by causing most or all of the TBC and bond coat to become detached from the substrate.

Figure 2:
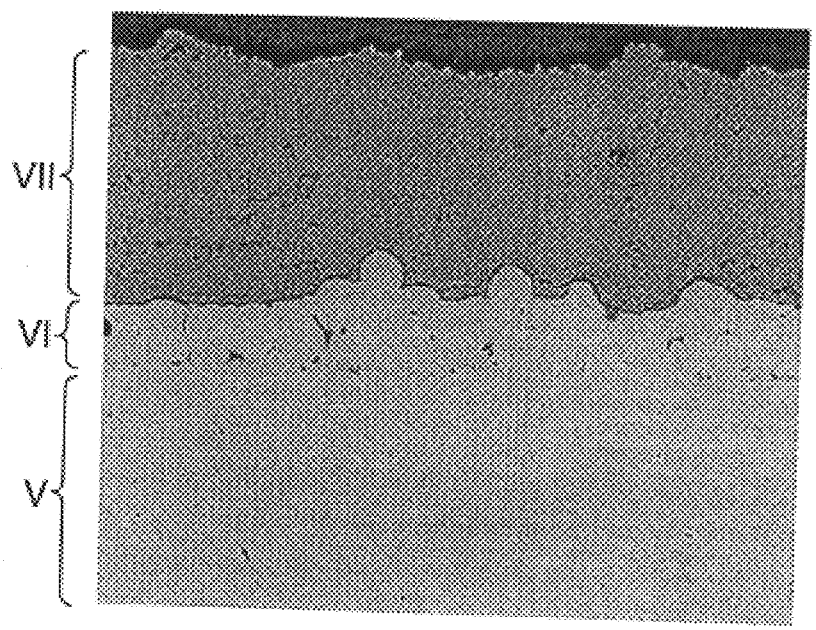
FIG. 2 is a cross-sectional photomicrograph of a bond coat/TBC coating system, in which the bond coat was applied by a slurry technique according to the present invention.

FIG. 2 is a cross-sectional photomicrograph of the coating system for sample B, prepared according to an embodiment of the present invention. The coating system was subjected to the same amount of thermal testing as sample A. Region V is the substrate. Region VI is the slurry layer applied and brazed over the substrate. Region VII is the TBC. The absence of the oxidation region seen in FIG. 1 indicates that accelerated oxidation at the bond coat-substrate interface has not taken place.

The type of thermal testing carried out for each sample was Furnace Cycle Testing (FCT). One cycle represented 45 minutes at 2000° F. (1093° C.). The process continued for 300 cycles for each sample. The results demonstrated that the present invention (sample B) had a furnace cycle life which was about 3 times greater than that of the comparative base line sample (sample A).

EXAMPLE 2

In this example, the same type of substrate was used, to prepare sample C. A slurry was prepared, containing 80 wt % of the Amdry® 100 high-temperature braze powder, along with 10 wt % water and 10 wt % polyethylene oxide binder. The slurry was applied to the substrate, to a wet thickness of about 5 mils (127 microns). The slurry was then allowed to dry for about 14–16 hours. About 15 wt % of the volatile material was removed in this drying step, leaving a green layer. A layer of braze contact adhesive (Nicrobraz™300) was then applied over the green layer.

The coarse NiCrAlY-type bond coat powder used in Example 1 (sample B) was then sprinkled onto the contact adhesive, to produce a mono-layer of coarse powder. The excess bond coat powder was blown off. The coupon was then heated in a vacuum furnace at a brazing temperature of about 1093–1204° C. (2000–2200° F.), for about 0.25–2 hours, to produce a dense, rough bond coat ($R_a$ of about 25 microns/984 micro-inches). The same type of thermal barrier coating (zirconia-based) used in sample A was then air plasma-sprayed over the bond coat.

FCT tests were carried out, as in Example 1. Sample C displayed approximately the same properties (resistance-to-cracking and delamination) as those of sample B. Moreover, sample C showed no indication of the accelerated oxidation at the bond coat-substrate interface, i.e., as evidenced for sample A.

Preferred embodiments have been set forth for the purpose of illustration. However, the foregoing description should not be deemed to be a limitation on the boundaries of the invention. Accordingly, various modifications, adaptations, and alternatives may occur to one skilled in the art without departing from the spirit and scope of the present invention.

All of the patents, articles, and texts mentioned above are incorporated herein by reference.

What is claimed:

1. A slurry composition, comprising:
    a braze material, said braze material comprising at least one metal selected from the group consisting of nickel, cobalt, iron, a precious metal, and a mixture which includes at least one of the foregoing; and
    a bond coat material, said bond coat material comprising at least one of
        a. an alloy of the formula MCrAlX, where M is selected from the group consisting of Fe, Ni, Co, and mixtures of any of the foregoing; and where X is selected from the group consisting of Y, Ta, Si, Hf, Ti, Zr, B, C, and combinations thereof, and
        b. a material selected from the group consisting of aluminide, platinum-aluminide, nickel-aluminide; platinum-nickel-aluminide; and mixtures thereof.
2. The composition of claim 1, wherein the braze material comprises at least about 40% by weight nickel.
3. The composition of claim 1, wherein the bond coat material is in the form of particles, and the particles have an average size of at least about 45 microns.

* * * * *